April 14, 1964

C. E. SCHOU 3,128,793

SELECTOR VALVE

Original Filed March 9, 1956

INVENTOR
CARL E. SCHOU

BY Strauch, Nolan & Neale

ATTORNEYS

April 14, 1964

C. E. SCHOU 3,128,793

SELECTOR VALVE

Original Filed March 9, 1956

INVENTOR
CARL E. SCHOU

BY *Strauch, Nolan & Neale*

ATTORNEYS

April 14, 1964  C. E. SCHOU  3,128,793
SELECTOR VALVE
Original Filed March 9, 1956
3 Sheets-Sheet 3
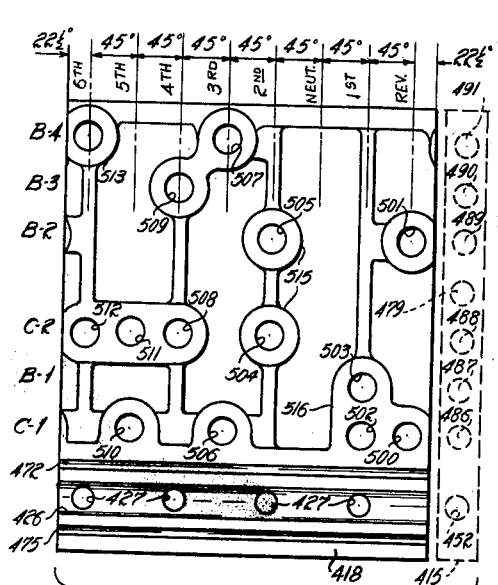
Fig. 5
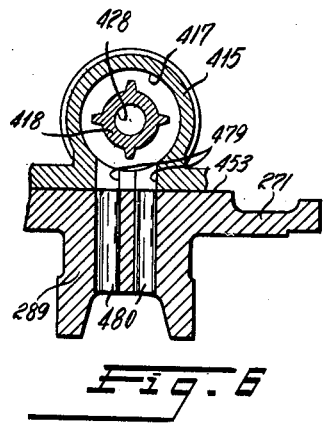
Fig. 6
Fig. 7
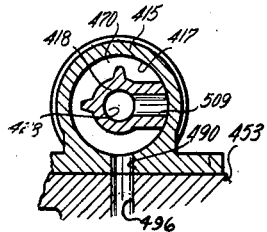
Fig. 8
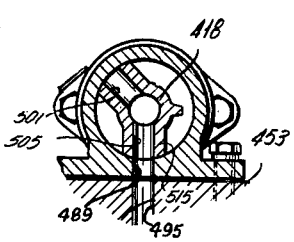
Fig. 9
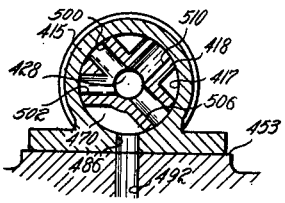
Fig. 12
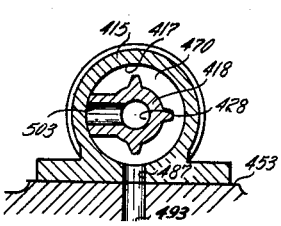
Fig. 11
Fig. 10
INVENTOR
Carl E. Schou
Strauch, Nolan & Neale
ATTORNEYS

United States Patent Office 3,128,793
Patented Apr. 14, 1964

3,128,793
SELECTOR VALVE
Carl E. Schou, Oshkosh, Wis., assignor to Rockwell-Standard Corporation, Coraopolis, Pa., a corporation of Pennsylvania
Original application Mar. 9, 1956, Ser. No. 570,462, now Patent No. 3,023,640, dated Mar. 6, 1962. Divided and this application July 18, 1960, Ser. No. 43,539
2 Claims. (Cl. 137—625.23)

This invention relates to an improved selector valve and more particularly to a rotary selector valve for use in multi-speed planetary transmission mechanisms, and capable of being rotated through multiple settings. This application is a division from my co-pending application Serial No. 570,462, filed March 9, 1956, for Drive Mechanism, now United States Letters Patent No. 3,023,-640, issued March 6, 1962.

The invention covered by said Letters Patent No. 3,023,640 is primarily directed to a multi-speed transmission mechanism driven by a prime mover through an intermediate transmission such as a multi-stage hydraulic torque converter. The preferred form is a six-speed transmission having three planetary systems: two main planetaries in compound relation and a third small secondary planetary gear train. Speed changes are accomplished by selected hydraulic actuation of various clutches and brakes within the transmission mechanism, and the multiple selectable actuations are accomplished by means of a rotatable, plural port selector valve.

This invention then relates to a new hydraulic selector valve especially developed for, but not restricted to, speed ratio control of multi-speed transmissions. The selector valve is more compact than previously used valves. By journalling the valve rotor in loose rollers, as spaced rotor end bearings, easier operation between and through multiple speed ratio settings has been accomplished using a stationary valve housing.

Accordingly, a primary object of this invention is to provide a novel, multi-port, multi-setting selector valve.

Another object resides in the provision of a novel hydraulic selector valve with a valve rotor journalled in loose rollers, as bearings, within a stationary housing, the rotor being rotatable between and through multiple speed ratio settings.

A further object resides in providing a novel actuator for turning the valve rotor, the actuator including a push and pull rod which can be controlled from either end, as required for a particular hydraulic system installation.

A still further object resides in providing a multi-setting selective control valve with a novel breather device for the hydraulic system in which the selective control valve is to be used.

Further novel features and objects of the present invention will become apparent from the following detailed description and the appended claims taken in conjunction with the accompanying drawings, illustrating a simple and practical embodiment thereof, in which:

FIGURE 5 is a development of the valve core for the hydraulic selector valve of FIGURES 2, 3 and 4 and a diagrammatic representation of the valve casing, illustrating the relationship of the core ports and valve ports;

FIGURE 6 is a section view taken along line 6—6 of FIGURE 1 showing selector valve drain openings to and through the transmission housing pad which mounts the selector valve;

FIGURE 7 is a section view taken along line 7—7 of FIGURE 2 showing the first and upper bank of rotor ports;

FIGURE 8 is a section view taken along line 8—8 of FIGURE 2 showing the second bank of rotor ports;

FIGURE 9 is a section view taken along line 9—9 of FIGURE 2 showing the third bank of rotor ports;

FIGURE 10 is a section view taken along line 10—10 of FIGURE 2 showing the fourth bank of rotor ports;

FIGURE 11 is a section view taken along line 11—11 of FIGURE 2 showing the fifth bank of rotor ports; and FIGURE 12 is a section view taken along line 12—12 of FIGURE 2 showing the sixth and lowermost bank of rotor ports.

The selector valve of this invention, as has been stated, was developed for use in a six-speed transmission, the subject matter of said Letters Patent No. 3,023,640, and hence will be described as constructed for that transmission. Inasmuch as the present invention does not per se involve the six-speed transmission, specific details of the interior of the transmission will not be disclosed herein, although if such details are necessary for a clear understanding of the present invention, reference may be had to the disclosure of said Letters Patent No. 3,023,640. Briefly, the transmission included two selectively operable hydraulic clutches which, in connection with operational description of the valve herein, will be referred to as clutches C–1 and C–2 (not shown). The transmission further included four hydraulically operable brakes which, in connection with operational description of the valve herein, will be referred to as brakes B–1, B–2, B–3 and B–4 (not shown). The exemplary valve thus is provided with six banks of control ports for simultaneously controlling operation of six controllable transmission components. Also, since the transmission had six forward speeds, a neutral condition and one reverse speed, the exemplary valve is constructed with eight angular rotor positions, each of which enabled selective operation of a different combination of brakes and/or clutches in the transmission. It is to be understood that a valve in accord with this invention could have more or less than six banks of control ports and more or less than eight angular selective control positions, depending upon the number of components and the number of conditions it is intended to control.

Figure 1:
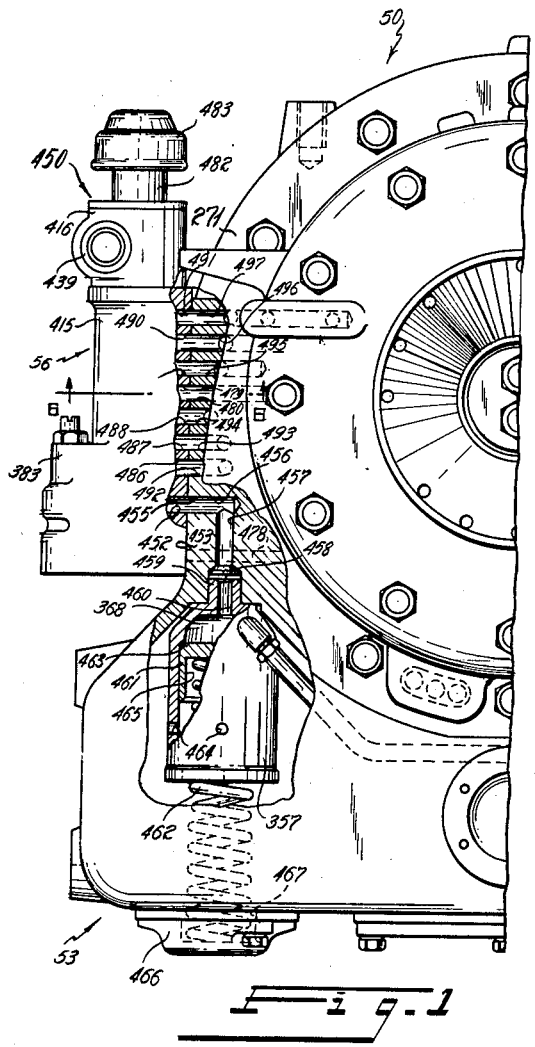
FIGURE 1 is a partially broken and sectioned one-half rear view of a six-speed transmission illustrating details of the selector valve of this invention.

Turning now to FIGURE 1, the selector valve assembly 56 is shown mounted on the side of a six-speed transmission 50 equipped with a flanged input member (not shown), a flanged output member 52 facing the viewer, and an oil sump 53. The hydraulic selector valve assembly 56 is used in such an installation to control transmission shift between possible speed ratio settings.

The transmission system functions with a supply of oil carried in the transmission sump 53, such oil furnishing fluid for the various transmission control systems, one of which includes the valve assembly 56. One or more oil pumps (not shown) are included in this system and oil under pressure flows through various lines from the pumps. One such high pressure oil line ends in a fitting (not shown) threaded into an inlet opening 410 (FIGURE 2) of a flow control valve 383 made integral with selector valve 56. The valve inlet opening 410 is coextensive with an internal passage 411 that extends through the flow control valve 383 and is intersected by a cross passage 412 to the bottom of the selector valve rotor. An adjustable needle plunger 413 is threaded in the upper portion 414 of passage 411 for reciprocable adjustment relative to the inner section of passages 411 and 412, thereby enabling control of the flow of oil into passage 412.

The two part housing of transmission selector valve 56 consists of a lower valve housing 415 and an upper actuator housing 416, the lower housing 415 having a vertical through bore 417 which receives a valve rotor 418. Loose rollers 419 and 420 adjacent the bottom and the top respectively of rotor 418, rotatably journal the rotor in the through bore 417 of the lower housing 415. Bottom rollers 419 are axially confined between a snap ring 421 engaging a groove inside the bore 417, and the lower shoulder 422 on rotor 418. Upper rollers 420 are confined between an upper rotor shoulder 423 and a snap ring 424 engaging a groove inside the bore 417.

The aforedescribed control valve cross passage 412 communicates with an annular groove 426 in the lower end of valve rotor 418 from which radial openings 427 extend inwardly to a high pressure axial bore 428 extending the length of rotor 418. Axial bore 428 is closed at the bottom by a plug insert 429 and is also closed at the top by the plug shaped end 430 of a stub shaft 431 which is non-rotatably secured in the end of rotor 418 as by a press fit. Stub shaft 431 includes a flange 432 that abuts the top of rotor 418 for relative axial positioning of the stub shaft. A valve rotor operating pinion gear 433 is held on the stub shaft 431 and locked against a tapered shoulder 434 by a nut 435.

The value rotor pinion 433 is disposed inside of the upper actuator housing 416 and is engaged by the teeth 436 of a valve rotor setting rack 437 (FIGURES 2 and 3) which is axially shiftable through a cylindrical bore 438 formed through cross member extensions 439 of the upper or actuator housing 416. Upper housing 416 is mounted on the lower or valve housing 415 by a spigoted connection and is fastened to the top of valve housing 415 by bolts 440. Shown in FIGURE 3, the rack 437 is provided with eight ratchet indentations 441 along its upper surface which are aligned with eight similar indentations 441 along the lower surface. These indentations are engaged by spring biased top and bottom ratchet detent plungers 442 located in upper and lower bosses 443 formed integral with actuator housing 416. Detent plungers 442 are retained within respective bores 444, provided in the upper and lower bosses 443, by bolts 445 threaded into the bores. The ratchet detent settings of rack 437 are coordinated with the valving of the valve rotor 418 so the ratchet settings of rack 437, as the rack moves from right to left (FIGURE 3), provides eight angular rotor pistons, e.g., positions corresponding to reverse, first, neutral, second, third, fourth, fifth and sixth speed settings for the exemplary transmission. Rack 437 has end flats 446 with a transverse end hole 447 to provide means for attaching a manually controlled linkage (not shown). A similar means, if desired, could be provided on the other end of rack 437. A cap assembly 450 is fastened over the top opening 451 of the actuator housing 416 by the aforementioned bolts 440 and has a function to be later described. Both the upper and lower openings of the actuator housing 416 are identical and the housing 416 and rack 437 can be removed, turned upside down and replaced to suit the particular transmission or hydraulic system installation.

The aforementioned annular groove 426 adjacent the lower end of the selector valve rotor 418 (FIGURE 2) is axially aligned with a port opening 452 in the valve housing 415. The valve housing 415, as clearly illustrated in FIGURE 1, is constructed to be mounted on a mounting pad 453, integral with transmission housing section 271, by bolts 454. When fastened to pad 453, the valve housing port opening 452 is aligned with a port 455 in the mounting pad, providing fluid communication from a passage 456 in housing section 271 (FIGURE 1). Passage 456 intersects a vertical passage 457 through the upper wall of transmission sump 53 and, at its sump end, is counterbored 458 to receive a reduced end portion 459 of a system accumulator casing 357. A short passage 460 in the accumulator reduced end portion 459 provides coextensive fluid communication to and from vertical passage 457 to the upper end of accumulator chamber 368. Accumulator chamber 368 contains a piston 461 which is resiliently urged toward the top of chamber 368 by a compressed vertically disposed coil spring 462. The upper limit of travel of the piston 461 is determined by its abutment against an annular internal cylinder chamber shoulder 463, and lower limit of piston travel is determined by a plurality of radially disposed accumulator oil over-flow openings 464 positioned a short distance above the skirt of cylinder housing 357. When piston 461 moves downward past the overflow opening 464 excess oil to the accumulator will overflow into the sump 53 thus ceasing to exert a downward force against the piston 461. The top end of coil spring 462 is received in a recessed spring seat 465 formed in the underside of piston 461 and its bottom end is seated in a recessed seat formed in a sump spring cover plate 466 fastened over an aperture 467 in the lower sump wall by bolts. Aperture 467 is of sufficient diameter to permit through passage of the spring 466 when cover plate 466 is removed. Thus an alternate source of oil under pressure can be introduced to the selector valve through the valve housing port 452.

Returning now to FIGURE 2, any oil leakage from the annular lower rotor groove 426 to the intermediate open space 470 between valve rotor 418 and the wall of housing 415 is limited by an oil seal 471 in rotor groove 472, and leakage past the rotor to the space 473 at the bottom of valve housing bore 417 is limited by an oil seal 474 positioned in rotor groove 475. The lower space 473 in valve housing 417 is closed at its bottom by a welch plug 476, and oil drainage from space 473 to the transmission sump 53 is provided by port openings 477 which extend through the selector valve housing 417 and into aligned passages 478 through the mounting pad 453 into the interior of the transmission housing member 271. Oil drainage from selector valve housing space 470 to the transmission sump 53 is provided by port openings 479 (see FIGURE 5) which extends through the wall of valve housing 417 to aligned passages 480 passing through mounting pad 453 into the interior of the transmission housing member 271. Numerous apertures in the wall between transmission housing 271 and its sump 53 permit all excess oil to drain down to the sump. In other hydraulic system installations similar drain holes will be provided through the selector valve mounting pad.

The selector valve cap assembly 450, mounted on the top of the actuator housing 416, caps the transmission or hydraulic system breather path which is defined by drain openings 480, ports 479, space 470 in the transmission selector valve 56, the pinion chamber 481 in the actuator housing 416, the upper actuator housing opening 451, cap chimney 482 and into the breather cap 483 of cap assembly 450.

Figure 2:
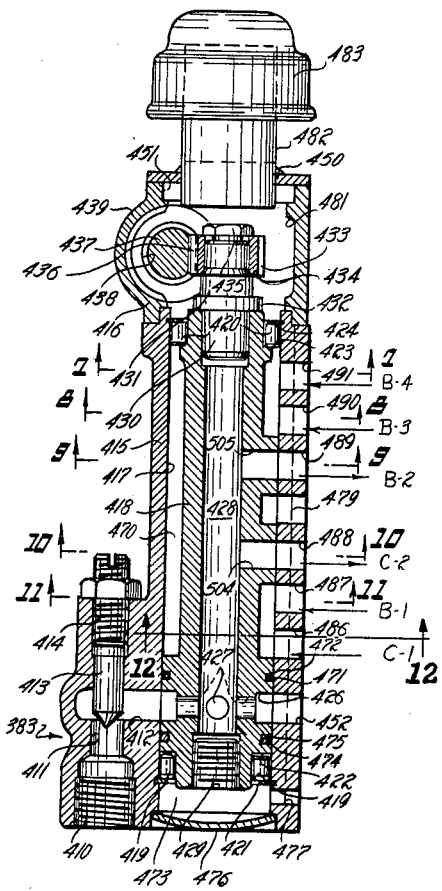
FIGURE 2 is an enlarged rear, partially sectioned view of the multi-speed selector valve.
Figure 4:
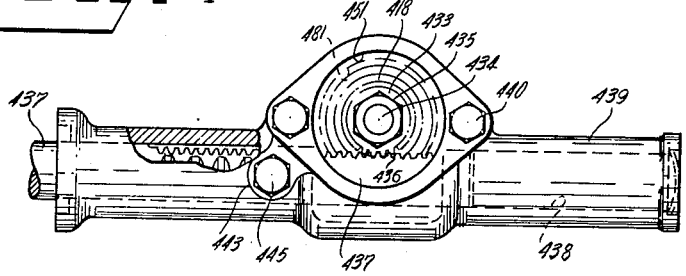
FIGURE 4 is a partially sectioned top plan view of the transmission hydraulic control valve with the breather cap omitted.
Figure 3:
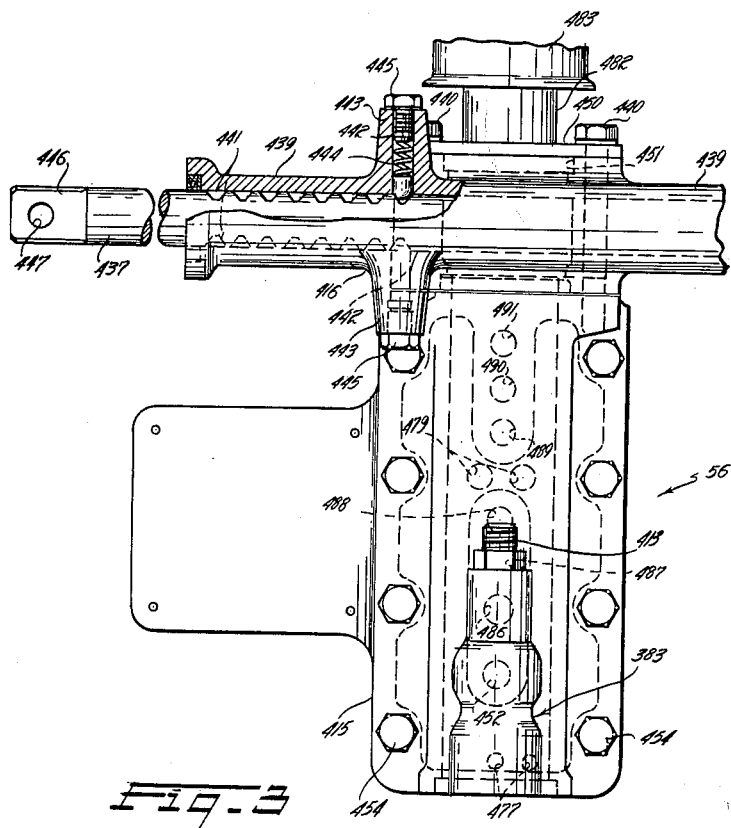
FIGURE 3 is a side view of the hydraulic selector valve, the ports through the mounting pad side being illustrated in dotted lines and the actuator housing being in partial section.

With reference to FIGURES 2 and 3, a plurality of ports 486, 487, 488, 489, 490 and 491 arranged in a vertical pattern are provided through the selector valve housing 416 from the inner cylindrical bore 417. When the selector valve 56 is mounted on the transmission housing mounting pad 453 (FIGURE 1), the valve housing ports are coextensively aligned with transmission housing high pressure oil passages in the following manner: port 486 leads to a passage 492 (for a clutch C-1); port 487 leads to a passage 493 (for a brake B-1); port 488 leads to passage 494 (for a clutch C-2); port 489 leads to a passage 495 (for a brake B-2); port 490 leads to passage 496 (for a brake B-3); and port 491 leads to a passage 497 (for a brake B-4). The high pressure passages just referred to, cooperate with other passages (not shown) provided internally of the transmission housing members and thence in fluid communication with the various transmission clutch and brake piston actuators.

FIGURE 5 illustrates a developed layout of the pressure outlet ports in the wall of selector valve rotor 418. At the right hand side of FIGURE 5, the vertical line labeled "REV" indicates the portion of rotor 418 disposed adjacent the vertical line of ports in the valve casing 415 when the rotor 418 is in a reverse selection. "Reverse" position places rotor outlet ports 500 and 501 in coextensive alignment with respective housing ports 486 and 489. When rotor 418 is rotated to first speed position which is the next vertical line to the left from reverse selection position, i.e., 45° from "REV," rotor outlet ports 502 and 503 are placed in coextensive alignment with respective housing ports 486 and 487. When the rotor 418 is placed in "NEUT" (neutral) there are no rotor ports hence there is no alignment of high pressure rotor outlet ports with housing ports. In second speed rotor position, 45° to the left of neutral the rotor outlet ports 504 and 505 are placed in coextensive alignment with respective housing ports 488 and 489. Third speed rotor position, 45° to the left of second speed, place rotor outlet ports 506 and 507 in coextensive alignment with respective housing ports 486 and 491. Fourth speed rotor position, 45° from third speed, places rotor outlet ports 508 and 509 in coextensive alignment with housing ports 488 and 490. Fifth speed rotor position, 45° from fourth speed, places rotor outlet ports 510 and 511 in coextensive alignment with housing ports 486 and 488. Sixth speed rotor position, 45° from fifth speed, places rotor outlet ports 512 and 513 in coextensive alignment with housing ports 488 and 491.

Various radially projecting bosses on the exterior of rotor 418 are provided for the rotor ports 500-513. These bosses (FIGURE 5) vary in shape, such as projections 515 for ports 504, 505 and 513, or the enlarged projection boss 516 through which the three ports 500, 502 and 503 are formed, and all bosses project across the space 470 between the body of rotor 418 and the cylindrical wall of valve housing bore 417 and are so contoured to be disposed in close proximity with the cylindrical surface of the valve housing bore. These bosses 515, 516, etc., minimize loss of oil from the rotor ports 500 through 513 into the valve space 470. Note that high pressure oil is supplied to the rotor bore 428 through the lowermost radial openings 427 in the rotor 418, hence the high pressure oil will be directed through selected ones of the selector valve housing ports 486 through 491, dependent upon the rotor position. Note also that space 470 between the rotor and the valve housing will provide free fluid communication between any of the housing ports 486 through 491 that are not coextensively aligned with a rotor outlet port in a specific rotor position, and then through the drain openings 479 in the valve housing 415 back to the transmission sump.

FIGURE 2 shows the rotor 418 of the selector valve 56 in the second speed position and the various section details, FIGURES 7 through 12, are sections with the rotor in the same position as in FIGURE 2. Note that FIGURES 9 and 10 illustrate the rotor bosses 515 positioned with ports 505 and 504 respectively directing high pressure oil to activate the brake B-2 and clutch C-2, while FIGURES 7, 8, 11 and 12 illustrate the drain space 470 around the valve rotor 418 in fluid communication to the various other brakes and clutches, so they will be deactivated.

The foregoing description discloses a novel hydraulic selector valve having a valve rotor journalled in loose rollers as bearings, the rotor being rotatable between and through multiple port control settings within a stationary housing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hydraulic valve rotor comprising an elongated hollow body having along its length a correlated series of laterally open hollow bosses for selective discharge of liquid from the interior of said body, bearing support means at opposite ends of said body, means closing both ends of said body, the closure means at one end comprising a plug rigid with the body and mounting a drive gear outside the body, means providing an annular liquid inlet passage on the body surface at the opposite end from said gear and connected by radial openings into said body interior, and annular seal means on the periphery of said body at opposite sides of said annular inlet passage.

2. A rotary hydraulic selector valve assembly comprising a selector valve housing having a bore, a plurality of longitudinally spaced openings in said housing all communicating at their inner ends with said bore, a hollow valve rotor closed at opposite ends and journalled in said bore and held against axial movement, means for introducing fluid under pressure into the interior of said rotor in any position of rotation of the rotor in said bore comprising an inlet passage through said housing, an adjustable control valve in said passage, an external annular recess on said rotor in constant communication with said inlet passage and with the interior of said rotor, means providing a plurality of laterally open ports in said rotor all constantly communicating with said interior of said rotor, an actuator housing secured upon said selector valve housing over one end of said bore, an end of said rotor projecting into said actuator housing, drive means carried by said actuator housing for selectively rotating said rotor through predetermined angular positions at each of which certain of said ports become aligned and in fluid communication with certain of said housing openings, all of the housing openings not connected to a rotor port being connected in fluid communication with said bore, means connecting said bore to a reservoir for collecting said fluid, and means providing a further passage through said housing in constant communication with said recess for connection of the interior of the rotor to an accumulator or the like.

References Cited in the file of this patent

UNITED STATES PATENTS

| | | |
|---|---|---|
| 1,450,372 | Irish | Apr. 3, 1923 |
| 2,312,941 | Tucker | Mar. 2, 1943 |
| 2,400,237 | Kylin et al. | May 14, 1946 |
| 2,672,884 | Cross | Mar. 23, 1954 |
| 2,814,309 | Koenig | Nov. 26, 1957 |
| 2,880,756 | Puls | Apr. 7, 1959 |
| 2,946,348 | North | July 26, 1960 |

FOREIGN PATENTS

| | | |
|---|---|---|
| 592,293 | Germany | Feb. 6, 1934 |
| 149,078 | Australia | Nov. 18, 1952 |